F. A. BURKHARD.
SCALE.
APPLICATION FILED JUNE 20, 1921.
1,408,264.
Patented Feb. 28, 1922.
2 SHEETS—SHEET 1.
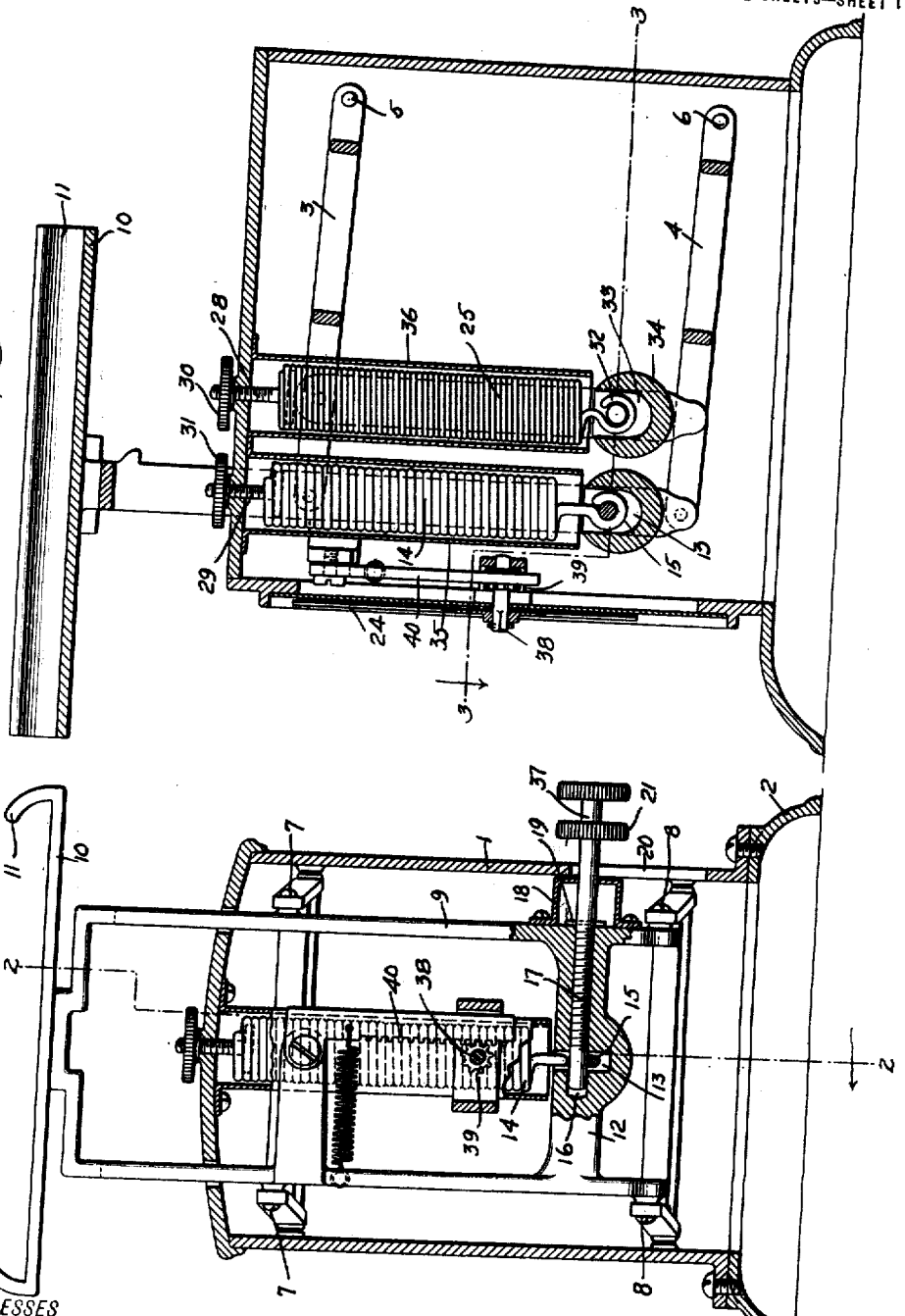
WITNESSES
INVENTOR
F. A. BURKHARD
BY
ATTORNEYS

F. A. BURKHARD.
SCALE.
APPLICATION FILED JUNE 20, 1921.

1,408,264.

Patented Feb. 28, 1922.
2 SHEETS—SHEET 2.

WITNESSES

INVENTOR
F. A. BURKHARD
BY
ATTORNEYS

UNITED STATES PATENT OFFICE.

FREDERICK A. BURKHARD, OF NEW YORK, N. Y.

SCALE.

1,408,264.  Specification of Letters Patent.  Patented Feb. 28, 1922.

Application filed June 20, 1921. Serial No. 479,153.

*To all whom it may concern:*

Be it known that I, FREDERICK A. BURKHARD, a citizen of the United States, and a resident of the city of New York, borough of Manhattan, in the county and State of New York, have invented a new and Improved Scale, of which the following is a full, clear, and exact description.

This invention relates to scales and has for an object to provide an improved construction wherein a comparatively heavy object may be accurately weighed or a comparatively light object may be accurately weighed.

Another object of the invention is to provide a scale in which a plurality of springs or counterbalancing elements are used and independently thrown into action so as to be sensitive to objects having different weights.

A further object, more specifically, is to provide a scale having a plurality of springs and manually actuated means for throwing one spring out of operation and another in for working the same dial, the arrangement being such that one of the scales will accurately weigh a heavy object and the other a light object.

In the accompanying drawings—

Figure 1 is a front view of a scale disclosing one embodiment of the invention, the front plate and associated parts being removed.

Figure 2 is a longitudinal vertical section through the scale shown in Figure 1, the same being taken on line 2—2.

Figure 3:
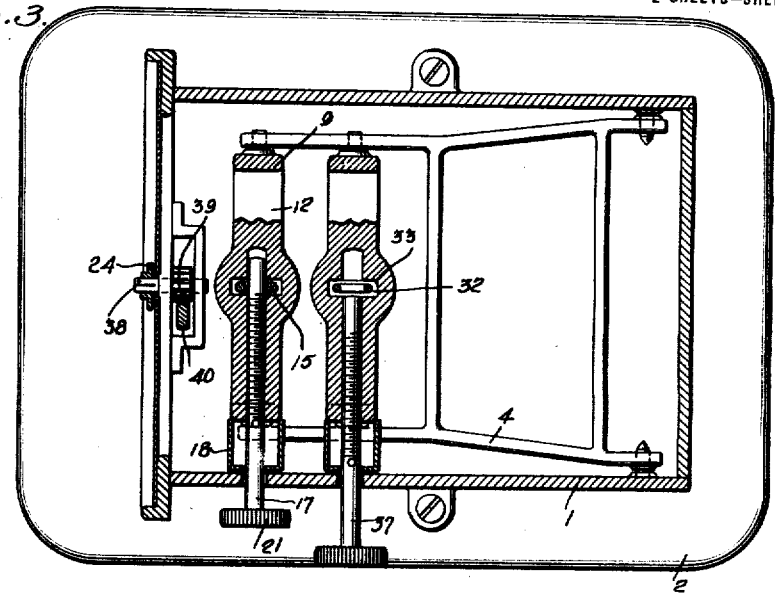
Figure 3 is a horizontal sectional view through Figure 2 on line 3—3.
Figure 4:
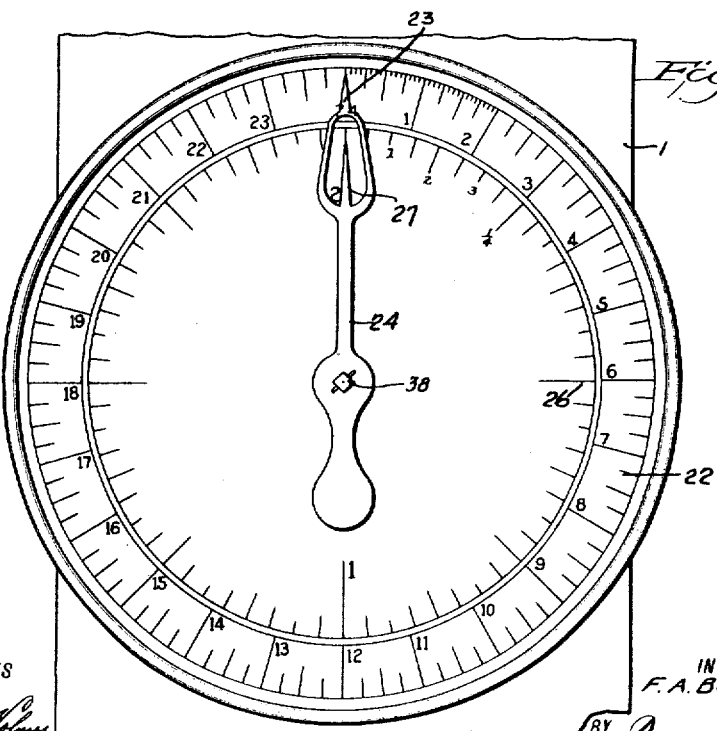
Figure 4 is a front view of the scale and pointer shown in Figure 2.

Referring to the accompanying drawings by numeral, 1 indicates a casing of any desired kind having a suitable base 2. Arranged in this casing are a pair of upper levers 3 and a pair of lower levers 4 pivotally mounted at 5 and 6 respectively to the casing 1, while the front ends are pivotally mounted respectively at 7 and 8 to the vertical moving or weighing frame 9. This frame extends through the upper plate of the frame 1 and carries a platform 10 having inturned flanges 11 whereby a large flat surface may be readily inserted or a scoop having flanges may be inserted and held against accidental disengagement. The frame 9 is provided with a comparatively large transverse bar 12 which is preferably integral therewith and which is provided with a socket 13 in line with the spring 14 whereby the eye 15 of spring 14 may be readily fitted into the socket 13 when the parts are at rest. A bore 16 is provided in the bar 12 and extends from one side of frame 9 to the socket 15 and a short distance therebetween. This bore is threaded for receiving a threaded shaft 17 which acts as an anchoring pin for anchoring the eye 15 to the bar 12 whereby when the frame 9 is depressed, spring 14 will be stretched or distended in proportion to the weight on frame 9. The shaft 17 extends through a suitable cap 18 which may be substantially U-shaped and which acts as a stop for the abutment pin 19, said pin extending through the shaft 17 and at one time resting against the frame 9 and at the other against the cap 18 whereby the longitudinal movement of shaft 17 is limited. This shaft extends through a suitable slot 20 in the frame 1 and is provided with a thumb member 21 exteriorly of the frame whereby it may be readily rotated at any time for insertion into the eye 15 or withdrawal therefrom. When it is inserted into the eye 15, spring 14 is operating and as this spring is comparatively heavy it takes care of the heavy weights and accurately weighs the same and indicates the correct weight on the outer graduations 22 shown in Figure 4, which outer graduations co-act with the end 23 of the hand 24. A second or weaker spring 25 acts with the inner graduations 26 as hereinafter fully described, which inner graduations co-act with the end 27 of hand 24. The spring 25 is supported by a screw 28 in a similar manner to the way the spring 14 is supported by the screw 29. Suitable nuts 30 and 31 engage the screws 28 and 29 for adjusting the respective springs 14 and 25. The lower end of spring 25 is provided with an eye 32 arranged in the socket 33 of a transverse bar 34 rigidly connected with the lower lever 4 in a similar manner to the way the transverse bar 12 is connected to the framework 9. Spring 25 is a much weaker spring than spring 14 and, consequently, is intended to weigh much lighter objects.

In the illustration shown in the drawing, spring 25 is intended to weigh an article having a maximum weight of two pounds while spring 14 is shown as being capable of weighing an article as heavy as twenty-four pounds. Suitable tubular guides 35 and 36 are provided for both the springs so as to hold them in proper position whereby the eyes 15 and 32 may readily enter the respective sockets 13 and 33. When it is desired to weigh an article less than two pounds, the threaded shaft 17 may be unscrewed for releasing spring 14 and the shaft 37, which is identical with shaft 17, may be screwed into position so as to interlock with the eye 32 so that spring 25 will function. In order to permit this to be done readily, frame 9 is raised upwardly until the springs are released whereupon the threaded shafts 17 and 38 may be readily moved in and out of the respective eyes. After the spring 25 has been thus brought into use, the hand 24 may be adjusted by operation of the nut 30 in case the same is necessary and then the article placed on the platform 10. The hand 24 will then rotate the desired distance and the end 27 will indicate the weight of the article accurately. It will be noted that the hand 24 will be compelled to rotate a quarter of a revolution in order to indicate one-half of a pound. It will also be noted that the end 27 of hand 24 must rotate for two graduations in order to indicate one ounce. In the large graduations 22, end 23 would move only a very small fraction of an inch to indicate an ounce and in fact, this movement would be so small as to be taken for an inaccuracy of the scale. It will thus be seen that it is very difficult to weigh one or even several ounces on the scale where only the large spring 14 is used but with the arrangement of shifting to a weak spring, ounces and even half ounces may be accurately weighed and at the same time the same hand used and also the same shaft 38, pinion 39 and rack 40. These members are old and well known but are used with both of the springs 14 and 25. They would also be used in case three or more springs were provided. By providing springs which are capable of weighing heavy or light objects, the spring 25 can be made as sensitive as desired and the adjustment from one form of scale to the other may be quickly and easily made.

What I claim is:—

1. In a scale of the character described, a dial face having a plurality of graduations thereon, a single hand moving over said dial face and provided with ends or pointers for each of the graduations, a counter-balancing or weighing spring for each of said pointers, and means for selectively controlling which spring shall be operated.

2. In a scale of the character described, a dial face provided with a plurality of concentrically arranged graduations, a single hand moving over said graduations, a weight carrying frame, means for connecting the weight carrying frame with the hand for causing the hand to move according to the amount of movement of said frame, a plurality of springs for resisting movement of said frame, and means for independently connecting said springs with said frame, there being one spring for each of said graduations.

3. In a scale of the character described, a weight carrying frame, means for guiding the frame as it moves back and forth, a plurality of springs independently connectable with said frame for supporting the same and yielding according to the weight placed thereon, a graduation on said dial face for each of said springs, a single hand movable over said graduations, and a single mechanism for connecting said frame with said hand for causing the hand to move in proportion to the movement of the frame.

4. In a scale of the character described, a weighing frame, means for guiding the frame in an up and down movement, a plurality of springs, adjustable pins for independently connecting the springs with said frame, said springs being of different strengths so as to make the frame more or less sensitive, and means connected with the frame for indicating the weight resting on the frame, said means indicating the weight for any of said springs.

5. In a scale of the character described, a weight carrying frame, means for guiding said frame in its reciprocatory movement, a plurality of cross bars connected with the frame and the means for guiding the frame, each of said cross bars having a socket, a shaft arranged in each of said bars and movable across said sockets, a spring for each of said bars, said springs being rigidly supported at one end while the opposite end is provided with eyes fitting into said sockets whereby either of said springs may be connected with said frame according to the position of said shafts, and means connected with said frame for indicating the weight regardless of the particular spring used, said means having a single hand or pointer and an independent graduation for each spring.

6. In a scale of the character described, a weighing frame, means for guiding said frame in a back and forth movement, a plurality of springs for supporting said frame, a guiding tube for each of said springs, means associated with each of said springs for independently connecting the same with said frame, said springs being of different strengths, a dial face provided with a plurality of graduations thereon, a single hand movable over all of said graduations, and a single mechanism for connecting said hand to said frame for indicating the weight on said graduations, there being one graduation for each spring.

FREDERICK A. BURKHARD.